United States Patent [19]

Colwill et al.

[11] 4,169,372

[45] Oct. 2, 1979

[54] METHOD OF TESTING AND APPARATUS FOR TESTING ENGINES

[75] Inventors: John A. Colwill; Richard J. Moulding, both of Loughborough, England

[73] Assignee: Brush Electrical Machines Limited, Leicestershire, England

[21] Appl. No.: 897,908

[22] Filed: Apr. 19, 1978

[30] Foreign Application Priority Data

Apr. 20, 1977 [GB] United Kingdom ............... 16338/77

[51] Int. Cl.² .............................................. G01L 3/02
[52] U.S. Cl. .............................................. 73/133 R
[58] Field of Search ...................... 73/116, 117, 133 R, 73/137, 138

[56] References Cited

U.S. PATENT DOCUMENTS 3,955,410   5/1976   Wakabayashi et al. ........... 73/133 R

OTHER PUBLICATIONS

GE News Bulletin: Airplane Engines For War Plants, Jul. 1942, GE Company, Schenectady, N.Y.

*Primary Examiner*—Jerry W. Myracle

*Attorney, Agent, or Firm*—Gifford, Chandler, VanOphem, Sheridan and Sprinkle

[57] ABSTRACT

Testing an engine having a rotary power output shaft by mechanically-coupling the output shaft of the engine to the rotor of a rotary electrical machine, operable alternatively in motor and generator modes, by connecting output/input conductors of the machine to conductors of an electrical supply main from which electrical power will be taken by the machine, when the machine is operating in the motor mode, and to which electrical power will be supplied by the machine, when the machine is operating in the generator mode, the electrical connections between the machine conductors and the supply main conductors being effected by a power converter including power-carrying devices of a semi-conductor type, e.g., thyristors, the power converter being operable to convert the output power from the machine to a form compatible with the main or to convert the main's supply to a form acceptable by the machine according to the mode of operation of the machine, controlling the power converter to operate the machine to apply either a controlled motoring or a controlled braking torque to the engine by changing the mode of operation of the machine and calculating and measuring the controlled torque.

11 Claims, 3 Drawing Figures

METHOD OF TESTING AND APPARATUS FOR TESTING ENGINES

FIELD OF THE INVENTION

The invention relates to a method of testing and apparatus for testing engines. By the term "engine" we mean any type of internal or external combustion engine having a rotary power output shaft at which torque is available.

DESCRIPTION OF THE PRIOR ART

The traditional methods of testing engines involve the use of a form of water-cooled friction or impeller, dynamometer-type brake to absorb the engine output power. In all such traditional methods, the engine output power is converted to heat which is usually wasted. The torque developed is measured by allowing the outer part of the brake (which develops a reaction torque against that produced by the engine-driven central part) to have a small rotational movement against a spring or deadweight force or a combination of these two. By changing this force manually, a balance condition can be reached and the torque computed from a knowledge of the force and the radius, that is the distance from the axis of rotation of the engine shaft, at which the force is applied. If the engine is running at a given speed and it is required to change the torque absorbtion capacity of the braking means rapidly, the braking means being usually either an impeller type of water brake or a friction brake, the water back pressure has to be increased (in the case of the impeller type water brake) or the brake shoe pressure has to be increased (in the case of the friction brake). This involves the actuation of valves or screw adjusters neither of which is convenient or fast in operation.

One object of the present invention is to provide a more easily controllable testing method and another object is to provide a testing method which facilitates recovery of as much of the power output from the engine under test as possible in a readily usable form.

SUMMARY OF THE INVENTION

According to the invention, there is provided a method of testing an engine having a rotary power output shaft by mechanically-coupling the output shaft of the engine to the rotor of a rotary electrical machine, operable alternatively in motor and generator modes, by connecting output/input conductors of the machine to conductors of an electrical supply main from which electrical power will be taken by the machine, when the machine is operating in the motor mode, and to which electrical power will be supplied by the machine, when the machine is operating in the generator mode, the electrical connections between the machine conductors and the supply mains conductors being efected by power conversion means including power-carrying devices of a semi-conductor type, the power conversion means being operable to convert the output power from the machine to a form compatible with the main supply or to convert the main's supply to a form acceptable by the machine according to the mode of operation of the machine, controlling the power conversion means to operate the machine to apply either a controlled motoring or a controlled braking torque to the engine by changing the mode of operation of the machine and calculating and measuring the controlled torque.

The invention also includes apparatus for performing the method of testing according to the immediately preceding paragraph, the apparatus comprising a rotary electrical machine, operable alternatively in motor and generator modes, power conversion means by which output/input conductors of the machine are connectable to conductors of an electrical supply main from which electrical power will be taken by the machine, when the machine is operating in the motor mode, and to which electrical power will be supplied by the machine, when the machine is operating in the generator mode, the power conversion means including power-carrying devices of a semi-conductor type and being operable to convert the output power from the machine to a form compatible with the main supply or to convert the main's supply to a form acceptable by the machine according to the mode of operation of the machine, means for controlling the power conversion means to operate the machine to apply either a controlled motoring or a controlled braking torque to the engine by changing the mode of operation of the machine, and means for calculating and measuring the controlled torque.

The machine may be a d.c. motor/generator and the power conversion means may be a converter bridge, including power-carrying devices of a semi-conductor type, connected to an a.c. supply main and operable as a variable current inverter when accepting power from the d.c. machine operating in the generator mode to return power to the a.c. supply correct in voltage, frequency and phase and operable as a variable current supply to the d.c. machine when the latter is operating in the motor mode and takes power from the a.c. mains.

In an alternative form of the apparatus, the machine is an asynchronous or synchronous motor and the electrical power conversion means is a regenerative variable frequency converter, including power-carrying devices of a semi-conductor type, connected to an a.c. supply main.

In either form of the power conversion means, the power-carrying devices employed may be thyristors, thyratrons, grid-controlled, mercury arc rectifiers, transistors or controlled rectifiers.

The aforesaid means for calculating and measuring the controlled torque conveniently includes an electronic calculating circuit responsive to instantaneous input signals derived from at least the rotational speed of the machine and the current taken or supplied thereby, the circuit including pre-settable circuit components operable to introduce loss characteristics that have been derived from predetermined performance curves of the machine, whereby instantaneous values of actual torque modified by the known losses can be calculated, the aforesaid means also including an instantaneously-operable indicator responsive to the modified torque values.

The apparatus as set out in one of the five immediately preceding paragraphs may include an inertia compensation circuit operable to accelerate or decelerate the machine at the same rate as the engine being tested. This circuit therefore enables inertia of the rotatable parts of the machine to be overcome so that the equivalent of a "no-load" dynamic test can be performed on the engine. The inertia compensation circuit may conveniently differentiate an instantaneous engine speed signal and thereby calculate acceleration or deceleration and produce an output signal derived from the calculated acceleration or deceleration which signal is used to apply an appropriate correction to the power conversion means.

When the machine is operating in the generator mode, the power conversion means is operable in either of the following ways:

(a) to control the speed of the engine in response to a speed set point signal, while an engine throttle control setting is maintained constant, by the power conversion means accepting a current from the machine such that the machine, operating as a generator, applies a load on the engine sufficient to maintain the engine speed at a speed corresponding to said speed set point signal, the torque developed by the engine at that speed and the aforesaid constant throttle setting being determined by the calculating and measuring means, or (b) to control the torque applied to the engine by the machine, operating as a generator, in response to a torque set point signal, the torque being determined and used as a feed-back signal, which is continuously compared with the torque set point signal in a control system, the speed of the engine being controlled by separate means acting on a throttle control of the engine.

BRIEF DESCRIPTION OF THE DRAWINGS

Two alternative forms of the apparatus are now described with reference to the circuit diagrams shown in FIGS. 1 and 2 and with reference to the circuit diagram shown in FIG. 3 which illustrates an expansion of part of FIG. 1 or 2.

DESCRIPTION OF THE PREFERRED EMBODIMENTS

Figure 1:
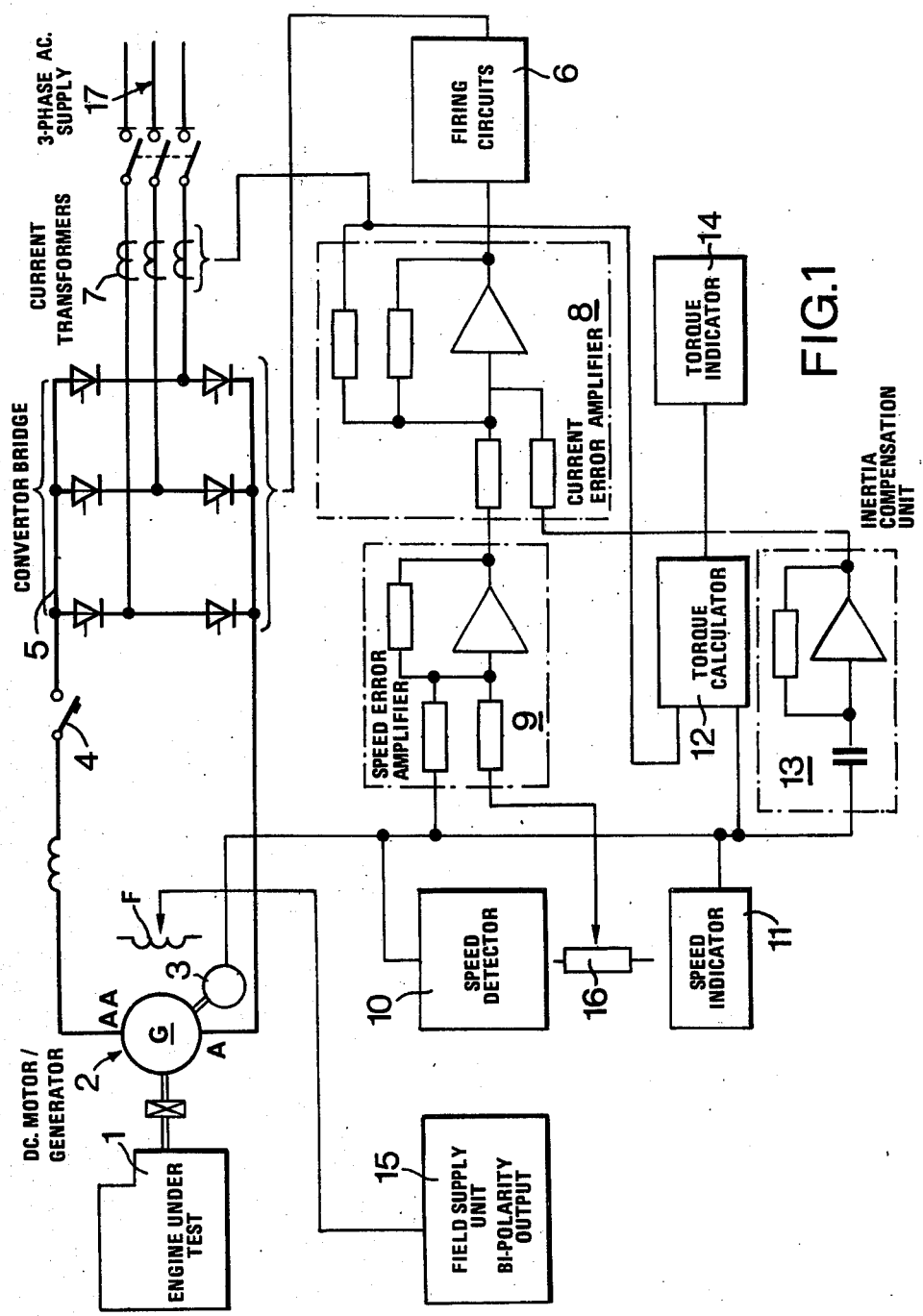

Referring first to FIG. 1, the apparatus includes a d.c. motor/generator 2 which is mechanically coupled to the output power shaft of an engine 1 under test. The d.c. machine 2 has coupled to it a d.c. tachogenerator 3 to monitor the speed of the d.c. machine which in a direct-coupled arrangement, as illustrated, is also the speed of the engine 1. The d.c. machine 2 has a shunt field winding F which is supplied from a bi-polarity field supply unit 15. One version of the unit 15 is a half-controlled, thyristor-diode, stabilized current bridge (not shown). The output from the unit 15 is reversible by contactors connected in series with the output but it is alternatively envisaged that this reversal may be effected by connecting two fully-controlled bridges in an inverse-parallel arrangement. The single half-controlled bridge may be replaced by a single fully-controlled bridge to reduce the field reversal time.

The armature G of the d.c. machine 2 is supplied with a variable voltage d.c. supply from a fully-controlled, 6-pulse converter bridge 5 via a circuit breaker 4. The converter bridge constitutes one version of the aforesaid power conversion means. In this version of the apparatus, provided by the invention, thyristors are used in both the controlled field supply unit 15 and the converter bridge 5. However thyratrons, transistors, grid-controlled mercury arc rectifiers, or other trigger-operable controlled rectifiers may be used instead of thyristors.

The converter bridge 5 is triggered, in a known manner, by firing circuits 6 in such a way that the converter bridge 5 can either act as a variable current supply to the d.c. machine 2 by taking power from the three-phase a.c. supply main 17 or as a variable current inverter, accepting power from the d.c. machine and returning it to the a.c. supply main 17, correct in voltage, frequency and phase.

When the converter bridge 5 is acting in the first mode described above, the polarity of the output from the field supply 15 is such that terminal A of the d.c. machine 2 is positive with respect to terminal AA. The d.c. machine then accepts power from the converter bridge 5 and acts as a motor which rotates the engine 1. Alternatively, when the polarity of the field supply 15 is reversed, terminal AA becomes positive with respect to terminal A and the converter bridge will be triggered in such a manner that current is returned to the supply main 17. The d.c. machine 2 in that mode accepts power from the engine 1 and returns it, via the converter, to the a.c. main supply. A controllable load torque is thus applied to the engine.

In the illustrated form of the apparatus, the converter bridge 5 is a 3-phase, 6-pulse, fully-controlled bridge. However, any other bridge configuration which is capable of acting as both a rectifier, supplying power to the d.c. machine, or as an inverter, supplying power to the a.c. supply system, could be used. The polarity of the d.c. machine 2 is reversable so that the single converter bridge 5 can return power to the a.c. supply. An alternative way of achieving this is to have two converter bridges similar to 5 connected in an inverse-parallel arrangement so that, for a given direction of engine rotation, one bridge supplies power to the d.c. machine and the other, inversely-connected bridge, acts as the inverter when power is required to be returned to the a.c. supply. Although usually this would be a more expensive method than shunt field reversal, the change from a motoring mode to agenerator mode is more rapid. This is sometimes necessary on certain engine test procedures.

Another alternative method would be to retain the single converter bridge 5 but to reverse the d.c. machine armature connections to it, using two cross-connected, double-pole contacts, when a change between the motoring and generating modes is required.

The speed at which the engine/d.c. machine unit rotates is monitored by the d.c. tachogenerator 3. A signal from the tachogenerator 3 is fed to a speed error amplifier 9 which compares the signal with a speed reference signal (or speed set point) from a device 16. In the apparatus being described, the speed reference signal is derived from a potentiometer but it could be derived from a computer, programmable logic controller or a similar process-control device. The amplified speed error signal from the amplifier 9 is fed as a current demand signal to a current error amplifier 8 which compares the current demand signal with a current feedback signal, derived either from three a.c. current transformers 7 connected in star or delta from which the output is rectified to produce a d.c. voltage proportional to the a.c. current passing into or out of the 3-phase a.c. supply main 17, or from two current transformers only, provided in any two of the lines of the 3-phase supply. This a.c. current is proportional to the d.c. current flowing through the d.c. machine 2. Other methods of d.c. current measurement may also be used such as resistive shunts, direct current transformers or transducers of the Hall Effect type.

The current absorbed or generated by the d.c. machine 2 is related to the torque at the engine shaft, but the relation of the current to the torque is only approximately related to the torque even where the d.c. machine 2 has fixed shunt excitation. To determine the torque sufficiently accurately to meet British Standard requirements (B.S. AU 141a:1971), the current and speed readings would have to be used to compute actual torque derived from predetermined performance curves for the d.c. machine. In the present apparatus being described this calculation is done automatically by a torque calculator unit 12 which takes analogue signals proportional to speed and current and modifies them in a preset way to produce an accurate torque reading. The known d.c. machine loss characteristics are preset into this unit. An instantaneous automatic display of engine torque and speed are thus continuously produced over the operating range of the equipment. The speed and torqiue readings are displayed on digital panel meters 11 and 14 respectively, but conventional analogue meters, digital printers, visual display units or computer interface units may alternatively be used.

At certain stages of engine testing it is required that the engine should accelerate or decelerate to or from its maximum governed speed under no load conditions. This is obviously only possible if the inertia of the d.c. machine is negligible. This is not the case and so to overcome this an inertia compensation circuit 13 has been added. The circuit 13, comprising a capacitor, a differential amplifier and a resistor, differentiates the engine speed signal and thus calculates acceleration. A preset proportion of this signal is summed into the converter current error amplifier 8. This signal is preset in size and sign such that when the engine is accelerating the d.c. machine 2 is arranged to produce a motoring torque to effect acceleration of itself at precisely the same rate as the engine under test. Similarly, when the engine is decelerating the d.c. machine is arranged to produce a braking torque, i.e., the machine 2 is then acting as a generator, to effect retardation of itself precisely the same rate as the engine under test. In this way, the engine behaves as if there were no inertia coupled to its output shaft.

Figure 2:
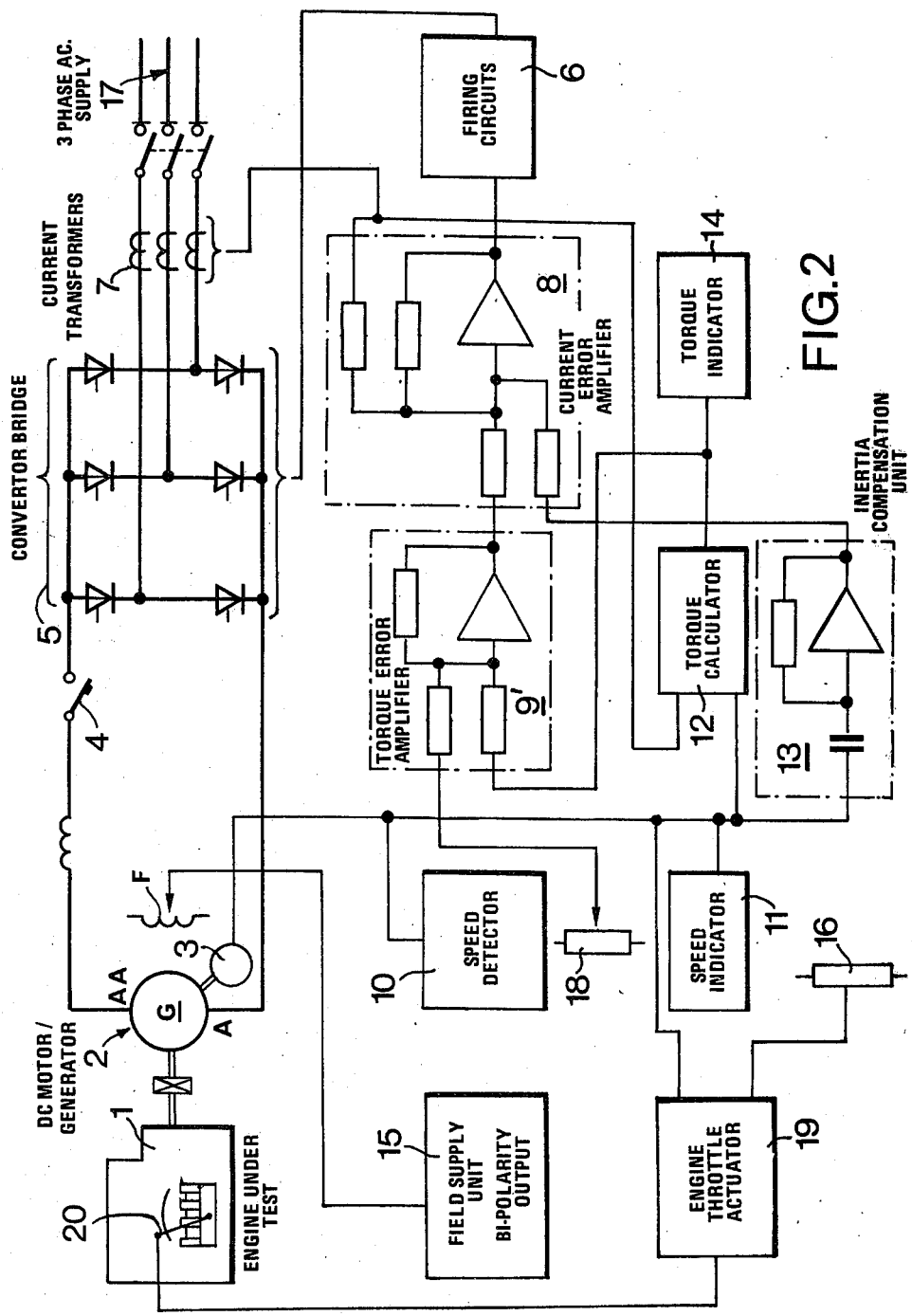

FIG. 2 illustrates a circuit generally similar to FIG. 1 except that instead of the speed error amplifier 9, the same or a similar circuit operates as a torque error amplifier 9' used to compare the output from the torque calculator 12 continuously with a torque set-point signal device 18 instead of as a direct speed error amplifier having an input connected, as in FIG. 1, to receive a direct signal from the tachogenerator 3. The speed at which the engine rotates is controlled in accordance with FIG. 2 by an engine throttle actuator 19 which continuously compares a speed set point signal from the device 16 with the signal from the tachogenerator 3. An amplified output error signal from the engine throttle actuator 19 automatically sets an engine throttle control, indicated at 20, on the engine 1 under test, to maintain the engine speed constant.

The circuits 1 and 2 may be formed in a combined circuit which can be selectively switched or changed for operation based on a speed set-point, as in FIG. 1, or for operation based on a torque set-point, as in FIG. 2.

A method of compensating for the losses in the d.c. machine and making a necessary correction to the armature current signal will now be described. It can be shown that the driving torque into a shunt-wound d.c. generator shaft can be resolved into the following components:

1. $k_1 \Phi I_a$, where $\Phi$ is the net magnetic flux intersecting the armature conductors, $I_a$ is the armature current and $k_1$ is a constant.

2. $k_2 N$— The friction and windage torque loss for a force-ventilated machine with a separately powered fan, where N is the motor speed and $k_2$ is a constant.

3. $k_3 \sqrt{N}$— The total iron loss, where $k_3$ is a constant.

4. $k_4 I_a$— The stray loss, where $k_4$ is a constant.

It is well-known that as the armature current increases, the magnetic field set up by this current distorts and reduces the net effective machine flux. It can be shown that term (1) above is modified by this effect ("armature reaction") to: $k_o I_a - k_1 I_a^2$, where $k_o$ is yet another constant.

The torque equation for a d.c. shunt wound generator becomes:

$$T = k_o I_a - k_1 I_a^2 + k_2 N + k_3 \sqrt{N} + k_4 I_a,$$

where T is the torque.

Figure 3:
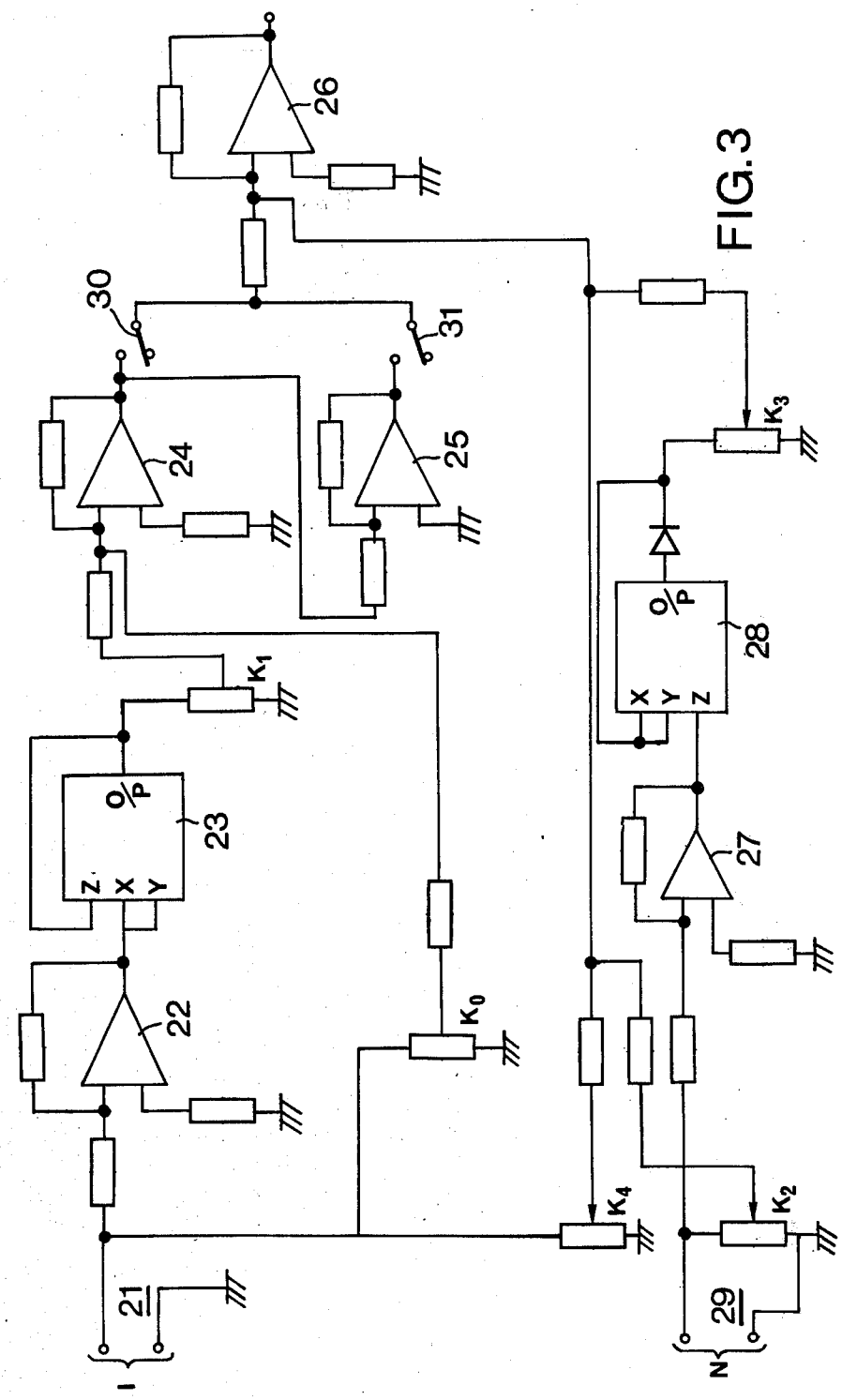

A circuit for computing these loss terms continuously and summing them to produce a signal accurately related to true engine output torque is shown in FIG. 3. The circuit of FIG. 3 would be included in box 12, torque calculator, in either of FIGS. 1 and 2.

A signal proportional to armature current is applied to terminals 21. Constants $k_o$ and $k_4$ in the preceding torque equation above are preset by potentiometers $K_o$ and $K_4$ and thus the signals fed to amplifier 24 and 26 respectively are $k_o I_a$ and $k_4 I_a$. The armature current signal I at 21 is also fed to amplifier 22 which adjusts the scaling and sign of the signal to be suitable for the multiplier 23. The multiplier 23 is connected so that the output signal, which is fed to potentiometer $K_1$ is proportional to $I_a^2$. The constant $k_1$, is set by potentiometer $K_1$ and is fed to amplifier 24. The term $k_2 N$ is derived from potentiometer $K_2$ which is fed from a non-reversing speed signal N at 29. This signal N can be derived from any speed measurement system that can be adapted to produce a d.c. voltage proportional to d.c. machine speed. The signal $k_2 N$ is fed directly to an output summing amplifier 26. The speed signal 29 is also fed to a sign inverting amplifier 27 which feeds a multiplier 28. This multiplier 28 is connected to act as a "square root" generator and so the signal fed from potentiometer $K_3$ is $k_3 N$, the potentiometer $K_3$ being set to introduce the constant $k_3$. Thus, with a knowledge of the particular d.c. machine loss characteristics, the constants can be preset into the circuit using potentiometers $K_o$ to $K_4$ and the resultant terms summed by amplifier 26 to produce a signal at its output proportional to the true shaft torque. When the machine is acting as a generator, the torque equation is as shown hereinbefore; but when the machine is acting as a motor, the signs of the terms $k_2 N$, $k_3 N$ and $k_4 I_a$ reverse. The signs of the terms $k_o I_a$ and $K_1 I_a^2$ may be reversed instead so that the sign of the total, compensated torque, reading changes instead. This is achieved by switches 30 and 31. When switch 30 is closed and switch 31 is open the output signal is derived from the input of the sign-inverting amplifier 25. When switch 31 is closed and switch 30 is opened, the output signal is derived from the output of amplifier 25 which is of opposite sign to its input. In this way a compensated torque signal can be produced for the motoring or generating modes.

The multipliers 23 and 28 and the amplifiers are solid-state types but could equally well be potentiometer servo-multipliers or valve amplifiers or similar components. The switches 30 and 31 are solid-state, semiconductor switches but could equally be of electro-mechanical type. The selection of which switch to be closed is performed by detectors and logic circuitry (not shown) which detect the polarity of the output of the speed error amplifier 9, shown in FIG. 1, or the output of the torque error amplifier 9', shown in FIG. 2, and hence the direction of rotation of the d.c. machine.

The circuit diagrams also show resistors, which would be of suitable values, as would be well-known to a competent electronics designer or engineer.

The circuits shown in the Figures are for a d.c. electrical machine. The method and apparatus provided by the invention may be applied to an a.c. electrical machine but in such a case, the torque calculator 12 would require additional input signals derived from the instantaneous voltage and frequency of the machine.

The input signals received by the torque calculator unit in the foregoing examples are analogue signals. Modification of the circuitry by using micro-processors may be made to enable digital control of the torque calculator to be effected.

Although it has been stated hereinbefore that the power conversion means is operable in either of the two ways shown in FIGS. 1 and 2, a third way, which is in effect a combination of these two ways is possible. This is to control the speed of the engine in response to a speed set-point signal while the engine throttle is used to control the torque applied to the engine. The circuit diagram of this arrangement will therefore be the same as that shown in FIG. 1 except that the throttle control 20 is connected, as in FIG. 2, to the engine throttle actuator circuit 19, also shown in FIG. 2, which receives an input signal from an output from the torque calculator circuit 12 instead of from the tachogenerator 3, as is shown in FIG. 2, and also an input signal from the torque set-point device 18, which is shown in FIG. 2.

The method and apparatus of testing engines in accordance with this invention has the following advantages over conventional engine testing techniques:

1. The maximum possible proportion of the engine power output is recovered and returned as electrical energy to the a.c. main supply, this being automatically synchronized in voltage, phase and frequency with the mains supply.

2. The apparatus can be rapidly adjusted by means compatible with modern electronic control techniques to absorb different powers at any engine or electrical machine speed within the range of the apparatus.

3. There is no requirement for an outer part of a brake mounted on bearings to allow restricted angular rotation for torque measurement to be provided or for a shaft-mounted torque transducer.

4. No special clean-water supply is required as for known impeller type of water brakes.

5. The apparatus can be used to provide a motoring torque as well as a braking torque, i.e., the apparatus may be used to start the engine, if the engine is not self-starting, or to crank the engine at high speed (with no fuel supplied to it) in order to measure friction losses.

What we claim as our invention and desire to secure by Letters Patent of the United States is:

1. A method of testing an engine having a rotary power output shaft by mechanically-coupling the output shaft of the engine to the rotor of a rotary electrical machine, operable alternativeiy in motor and generator modes, by connecting conductors of the machine to conductors of an electrical supply main from which electrical power will be taken by the machine, when the machine is operating in the motor mode, and to which electrical power will be supplied by the machine, when the machine is operating in the generator mode, the electrical connections between the machine conductors and the supply main conductors being effected by power conversion means including power-carrying devices of a semi-conductor type, the power conversion means being operable to convert the main supply to a form acceptable by the machine when the machine is operating in the motor mode and to convert the output power from the machine to a form compatible with the main supply when the machine is operating in the generator mode, controlling the power conversion means to operate the machine to apply a controlled braking torque to the engine when the machine is operating in the generator mode, calculating and measuring the controlled torque and selecting the mode of operation of the machine.

2. Apparatus for testing an engine having a rotary power output shaft, the apparatus comprising a rotary electrical machine operable alternatively in motor and generator modes and to be coupled, in use, to said rotary power output shaft, power conversion means by which conductors of the machine are connectable to conductors of an electrical supply mains from which electrical power will be taken by the machine, when the machine is operating in the motor mode, and to which electrical power will be supplied by the machine, when the machine is operating in the generator mode, the power conversion means including power-carrying devices of a semi-conductor type and being operable to convert the mains supply to a form acceptable by the machine when the machine is operating in the generator mode and to convert the output power from the machine to a form compatible with the mains supply when the machine is operating in the motor mode, means to control the power conversion means to operate the machine to apply a controlled motoring torque to the engine when the machine is operating in the motor mode and to apply a controlled braking torque to the engine when the machine is operating in the generator mode, means for calculating and measuring the controlled torque and means for selecting the mode of operation of the machine.

3. Apparatus as claimed in claim 2 in which the machine is a d.c. motor generator and the power conversion means is a converter bridge including power-carrying devices of a semi-conductor type, connected to a.c. supply mains and operable as a variable current inverter when accepting power from the d.c. machine operating in the generator mode to return power to the a.c. supply correct in voltage, frequency and phase and operable as a variable current supply to the d.c. machine when the latter is operating in the motor mode and takes power from the a.c. main.

4. Apparatus as claimed in claim 2 in which the machine is an a.c. motor and the electrical power conversion means is a regenerative variable frequency converter, including power-carrying devices of a semi-conductor type, connected to an a.c. supply main.

5. Apparatus as claimed in claim 2 in which the power-carrying devices employed are thyristors.

6. Apparatus as claimed in claim 2 in which the means for calculating and measuring the controlled torque includes an electronic calculating circuit responsive to instantaneous input signals derived from at least the rotational speed of the machine and the current passing through the conductors of the machine, the circuit including pre-settable circuit components operable to introduce loss characteristics that have been derived from predetermined performance curves of the machine, whereby instantaneous values of actual torque modified by the known losses can be calculated, the aforesaid calculating and measuring means also including an instantaneously-operable indicator responsive to the modified torque values.

7. Apparatus as claimed in claim 6 including an inertia compensation circuit operable to adjust the speed of rotation of the machine rotor to the same speed as the engine being tested.

8. Apparatus as claimed in claim 7 in which the inertia compensation circuit is capable of differentiating an instantaneous engine speed signal and thereby calculates rate of change of rotational speed and produces an output signal derived from the calculated rate of change of rotational speed which signal is used to apply an appropriate correction to the power conversion means.

9. Apparatus as claimed in claim 2 in which the power conversion means is operable to control the speed of the engine in response to a speed set point signal while an engine throttle control setting is maintained constant, by the power conversion means accepting a current from the machine such that the machine, when operating as a generator, applies a load on the engine sufficient to maintain the engine speed at a speed corresponding to said speed set point signal, the torque developed by the engine at that speed and the aforesaid constant throttle setting being determined by the calculating and measuring means.

10. Apparatus as claimed in claim 2 in which the power conversion means is operable to control the torque applied to the engine by the machine, when operating as a generator, in response to a torque set point signal, the torque being determined and used as a feed-back signal, which is continuously compared with the torque set point signal in a control system, the speed of the engine being controlled by separate means acting on a throttle control of the engine.

11. Apparatus as claimed in claim 2 in which the power conversion means is operable to control the speed of the engine in response to a speed set point signal while an engine throttle control is controlled in response to the torque developed by the engine at that speed, as determined by the calculating and measuring means, and compared with a torque set point signal.

* * * * *